(12) United States Patent
Minnigh et al.

(10) Patent No.: US 6,843,598 B2
(45) Date of Patent: Jan. 18, 2005

(54) IMAGING PLATE CASSETTE FOR EXTENDED X-RAY PHOTOGRAPHS

(75) Inventors: Denise Minnigh, Stamford, CT (US); Todd Minnigh, Stamford, CT (US)

(73) Assignee: Fujifilm Medical Systems, U.S.A., Inc., Stamford, CT (US)

(*) Notice: Subject to any disclaimer, the term of this patent is extended or adjusted under 35 U.S.C. 154(b) by 52 days.

(21) Appl. No.: 09/932,659

(22) Filed: Aug. 17, 2001

(65) Prior Publication Data

US 2002/0044630 A1 Apr. 18, 2002

Related U.S. Application Data

(60) Provisional application No. 60/226,709, filed on Aug. 18, 2000.

(51) Int. Cl.[7] .............................................. G03B 37/00
(52) U.S. Cl. ...................... 378/174; 378/182; 250/484.4
(58) Field of Search ................................ 378/174, 169, 378/172, 182, 187, 198, 173; 250/583, 581, 580, 484.4

(56) References Cited

U.S. PATENT DOCUMENTS

| 3,725,703 A | * | 4/1973 | Bucky ........................ 378/174 |
| 3,804,625 A | * | 4/1974 | Sorli .......................... 396/527 |
| 4,032,790 A | | 6/1977 | Nakamura |
| 4,498,005 A | * | 2/1985 | Oono et al. ............... 250/484.4 |
| 4,521,904 A | | 6/1985 | Takano |
| 4,811,546 A | | 3/1989 | Takashima et al. |
| 5,174,560 A | | 12/1992 | Fujii |
| 5,388,818 A | * | 2/1995 | Anton et al. ................. 271/209 |
| 5,757,888 A | | 5/1998 | Fujii |
| 5,901,240 A | * | 5/1999 | Luo et al. .................... 382/132 |
| 6,273,606 B1 | * | 8/2001 | Dewaele et al. ............. 378/174 |
| 6,744,062 B2 | * | 6/2004 | Brahm et al. ............... 250/584 |

* cited by examiner

Primary Examiner—Edward J. Glick
Assistant Examiner—Hoon Song
(74) Attorney, Agent, or Firm—Stroock & Stroock & Lavan LLP

(57) ABSTRACT

A method of taking an extended X-ray photograph by using an imaging plate or a computed radiography cassette devised to contain a longer digital X-ray image such that a longer complete image of a subject may be rendered such that no diagnostic information is lost in examinations of scoliosis or the long bones of the body. When the cassette is exposed to X-rays through an object, an X-ray transmission image of the object is recorded on a stimulable phosphor sheet and, at the same time, the X-ray film is exposed to light instantaneously emitted from the stimulable phosphor sheet upon exposure to X-rays to record an extended photographic latent image of the X-ray transmission image of the object on the X-ray film or a photostimulable phosphor sheet alone.

10 Claims, 5 Drawing Sheets

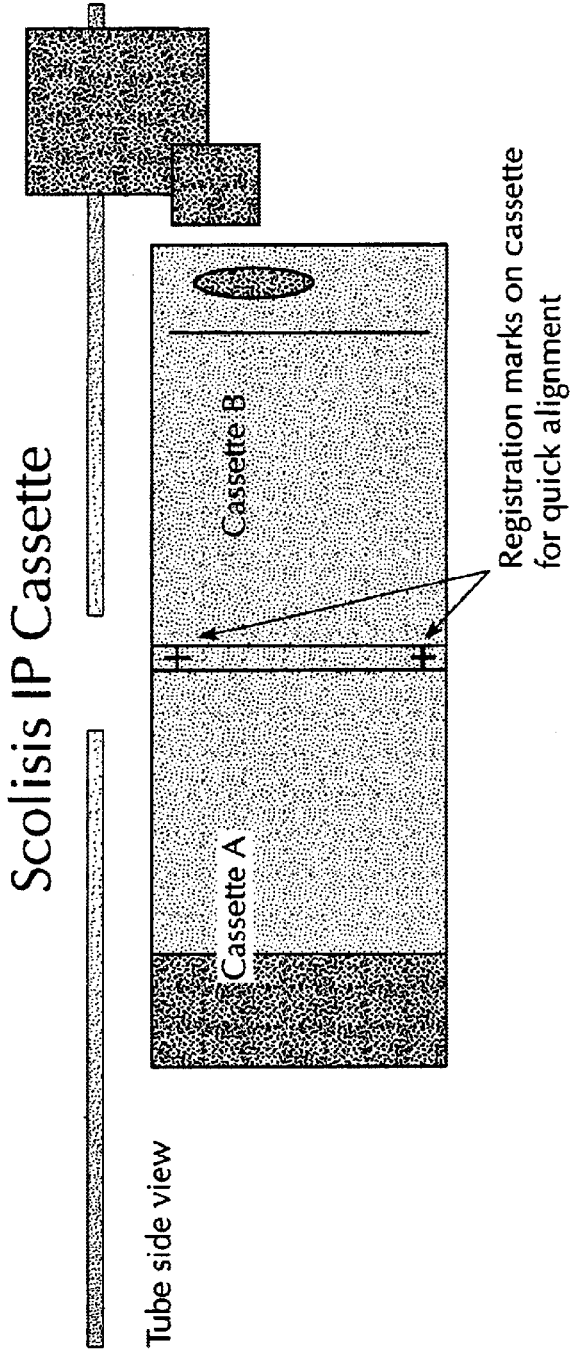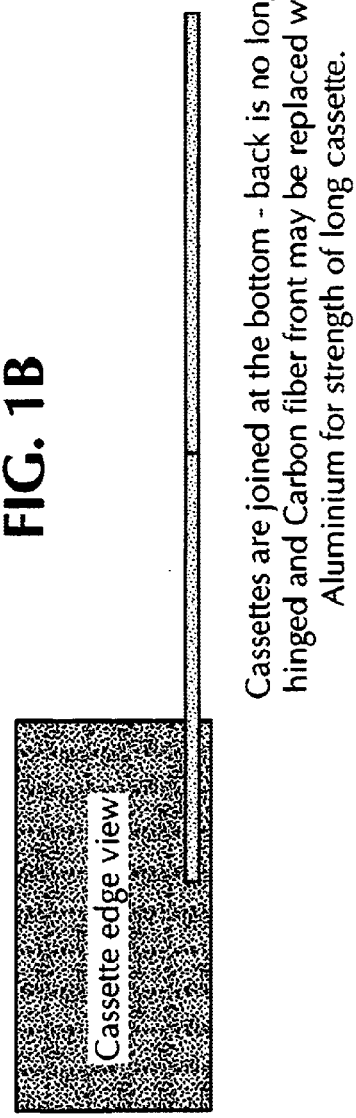

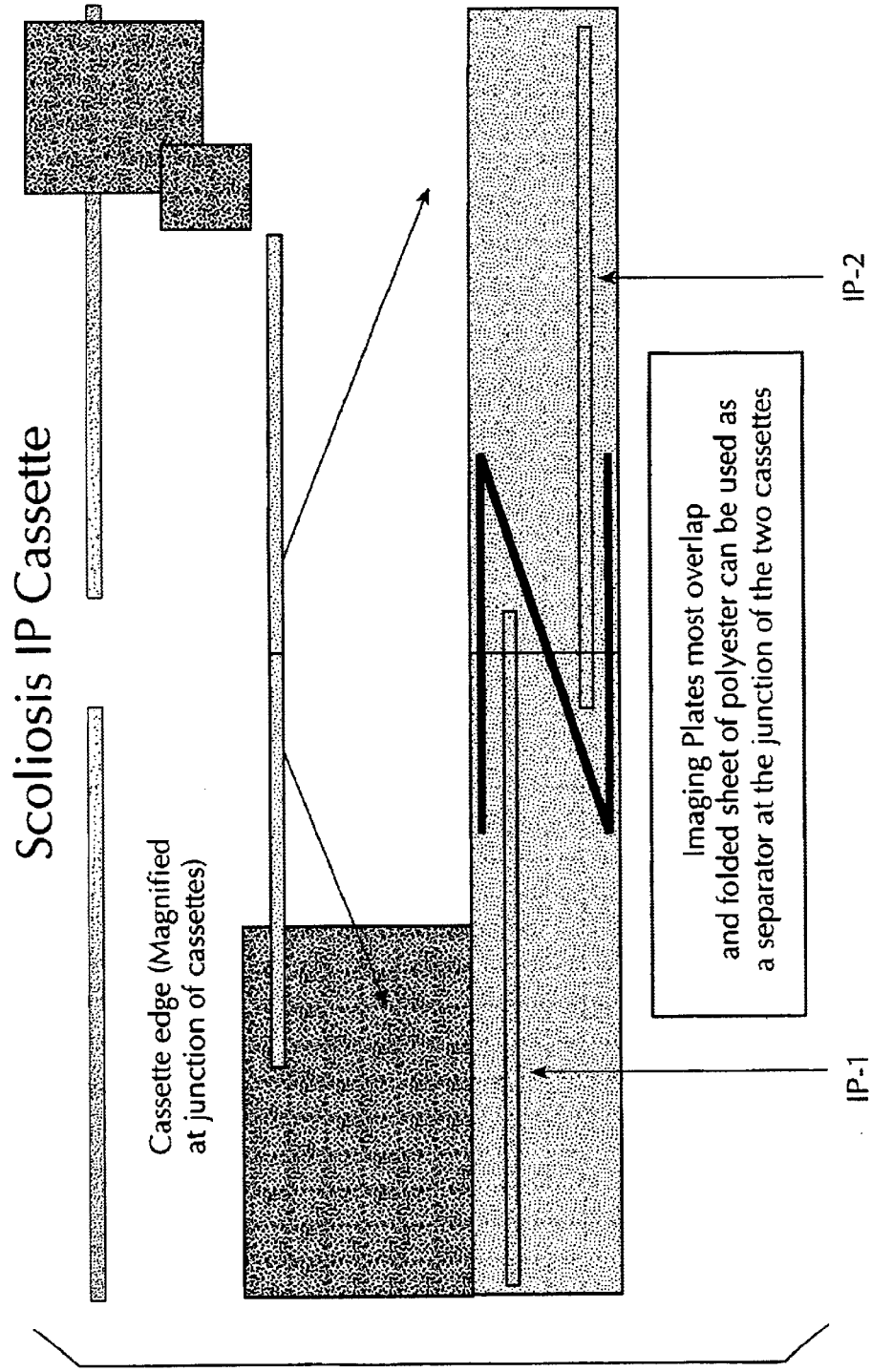

IMAGING PLATE CASSETTE FOR EXTENDED X-RAY PHOTOGRAPHS

CROSS-REFERENCE TO RELATED APPLICATIONS

This application claims priority from U.S. Provisional Appl. Ser. No. Provisional Patent Application Ser. No. 60/226,709, filed Aug. 18, 2000 under 35 U.S.C. §111(b).

FIELD OF THE INVENTION

The invention generally pertains to an X-ray film cassette apparatus. More particularly, the invention relates to an modified x-ray film cassette holder that provides for the use of extended length film and/or overlapping imaging plates such that complete x-ray images can be provided for the spine or long bones of the body.

BACKGROUND OF THE INVENTION

X-rays photographs are generated through the exposure of x-ray sensitive film or imaging elements to the penetrating electromagnetic radiation of accelerated electrons suddenly stopped in their trajectory by collision with a solid body. In this fashion x-rays typically pass through soft tissue of the body but will by stopped by denser structures such as bone and some tumors. These features then allow x-ray radiography techniques to aid in the diagnosis and treatment of injuries or other ailments.

Computed Radiography

In computed radiography, a photographic element has an image formed upon its surface by x-rays, and the element is subsequently provided to a reader where the photographic element is stimulated to emit a radiation pattern that is captured for storage and use. Computer Radiography (CR) utilizes a phosphor screen with energy storage capability as an X-ray image receptor. The screen is contained in standard size radiographic cassettes and in integrated imaging stands or tables. The cassettes can be used in existing radiographic tables and stands.

Cassettes of the kind used in computed radiography may comprise a container having upper and lower parts that are hinged together so that they can be opened for insertion of a thin, flexible film sheet imaging state or rigid film plate comprising the photographic element. The cassette is closed and latched so that the cassette with the element therein can be used with an x-ray apparatus to produce an image on the photographic element. Then the cassette is taken to a reader where the cassette must be opened and the photographic element extracted by suitable feeders, such as suction feeding devices. The photographic element separate from the cassette is transported through the reader where it is stimulated to emit a radiation pattern and subsequently erased before being returned to the cassette for re-use.

This technology can offer diagnostic quality advantages over conventional film/screen methods and decreases in the time required for processing. Advantages of computed radiography include energy subtraction, which makes it possible to view bone-only and soft tissue-only images of the chest, dynamic range control and gradation processing, which makes it possible to see both bone and soft tissue on the same image.

With computed radiography before the phrase "the cassettes are transferred offers", the cassettes are transferred to a reader system, or in the case of integrated devices, the reading section of the device. Here the imaging plate is scanned with a finely-focused laser beam which stimulates luminescence proportional to the local X-ray exposure. The luminescence signal is converted to an electrical signal and is thereby digitized. The data representing the image is subjected to digital signal processing to optimize the diagnostic content of the visualized data. The image can be recorded on laser printed film transmitted or stored digitally.

Gradation processing is done via computer to optimize image contrast and optical density. Image contrast can be adjusted as desired, in accordance with the anatomical region and diagnostic purpose.

Energy subtraction expands diagnostic capabilities by providing a user with three views instead of just one: the standard radiograph, a bone subtracted radiograph and a soft tissue subtracted radiograph.

Cassette Construction

Typically an X-ray film cartridge is composed of a rectangular cartridge body and a rectangular cover hinged to the body. The cover is locked by means of a pair of latches mounted to one side of the cover opposite to the side hinged to the body. Often, a cushion pad is interposed between the cover and at least one intensifying sheet attached to the cover so as to press the intensifying sheet against the X-ray film. The cover is of rectangular shape and has hinges on one side edge thereof and latch means on the opposite ends thereof. The hinge is usually composed of a pair of hinges to pivotally mount the cover at one side thereof to the body, and the latch typically is composed of a pair of latches slidably mounted to the cover to be engaged with a pair of slots provided in one side wall of the cartridge body. Therefore, the hinged cover is held to the cartridge body at four points.

The above described conventional X-ray film and film cassette, whether viewed as a typical x-ray photograph or digitized through computer radiography techniques, using storage phosphor imaging plates has a defect in that the film or visualizing element fitting within the cassette is generally not long enough to provide a full view of the spine (e.g. for scoliosis patients) or the other long bones of the body. To remedy this situation the prior art has relied multiple and sequential x-ray exposures or other more expensive procedures, such as CT scans or magnetic resonance imaging (MRI). The sequential x-ray photographs of the prior art invariably left a small portion of the structure to be imaged off the x-ray photographs, leading to a gap in the diagnostic ability of x-ray procedures. Meanwhile, though the more expensive MRI imaging can be used to evaluate the spinal cord and spinal nerves this capability is often missing from existing clinical institutions or is not available on a routine basis. As with all studies, MRI is done for a specific indication and correlated with clinical examination. Myelography, a radiographic study which uses an injected dye to provide contrast to study the spinal canal and its contents, may also be used for situations in which conditions such as scoliosis are suspected but is fairly labor intensive and exposes potential patients to radioactivity for a longer period than typical x-ray procedures. CT scans are used to provide improved definition of abnormalities of vertebral size, shape or number and are also not always available on a routine basis.

Accordingly, a need exists to provide a x-ray photograph and corresponding x-ray film cassette that will provide for routine and improved x-ray photographs of the spine or other long bones of the body.

The subject invention provides the following advantages over the prior art:

Allows an imaging plate (IP) to be run through a computed radiography reader without manually removing the IP from the cassette.

Prevents the loss of image information between IP's by overlap of IP's.

Provides imaging capability for automatically processing images up to 14"×34", previously 14"×17" was the maximum size.

Enables convenient use of the Fuji Computed Radiography scoliosis and long leg examinations.

SUMMARY OF THE INVENTION

The primary object of the present invention is to provide an apparatus and method for recording a x-ray image on either a stimulable phosphor screen or imaging plate and on a conventional X-ray film with a substantially equal intensity of X-rays. The image so recorded is one that provides an overlapping image so that no diagnostic information is lost in a modified cassette holder.

Another object of the present invention is to provide a method of recording a x-ray image of excellent sharpness and resolution both on a stimulable phosphor screen or imaging plate and on a conventional X-ray film.

A specific object of the present invention is also to provide a cassette for use in conjunction with the method mentioned above.

Another object of the present invention is to provide an extended X-ray film imaging plate that is able to obtain a sharp image of an extended body section with a simple structure.

BRIEF DESCRIPTION OF THE DRAWINGS

FIG. 1A Shows a side-view of an imaging plate (IP) cassette of the invention in which two standard size cassettes are modified to provide for an extended X-ray image of a target.

FIG. 1B Shows an edge-view of an imaging plate cassette of the invention in which two standard size cassettes are modified to provide for an extended X-ray image of a target.

FIG. 4 Shows the "Z" fold of material that is preferably part of the invention.

DESCRIPTION OF THE PREFERRED EMBODIMENT

In FIGS. 1 to 5, an X-ray cassette 10 in accordance with an embodiment of the present invention is mainly for recording an X-ray image of the chest of a human body (not shown) on an X-ray film.

Figure 2:
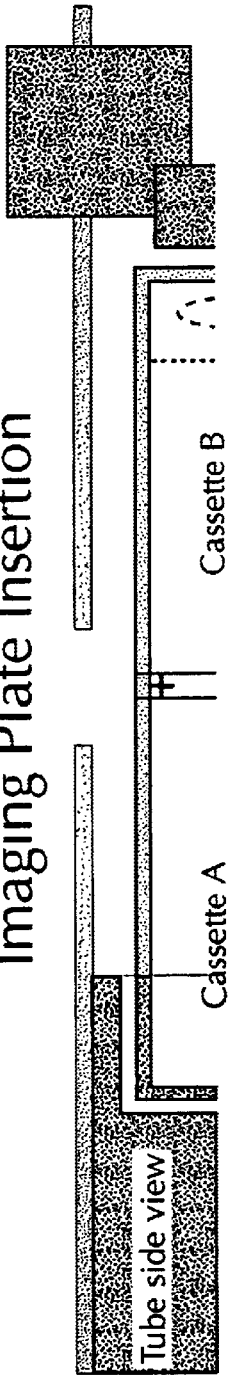
FIG. 2 Shows two imaging plates of the invention inserted into a modified X-ray cassette in an overlapping confirmation.
Figure 3A:
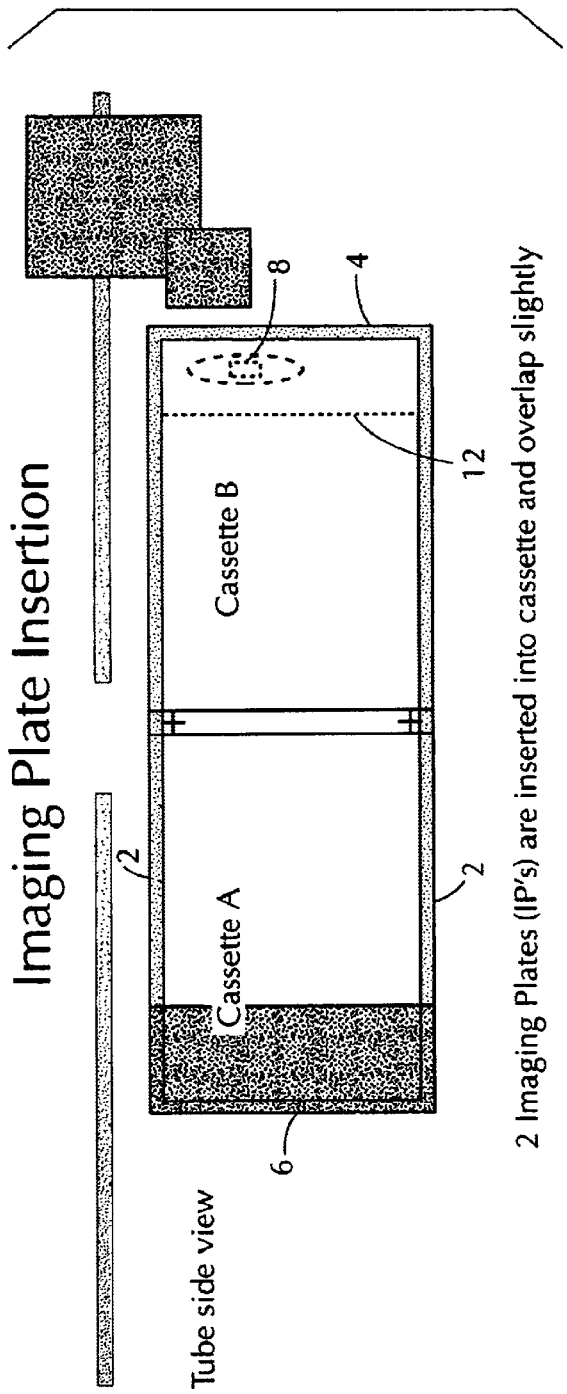
FIG. 3A Shows a tube side view of two imaging plates inserted into a modified cassette of the invention.
Figure 3B:
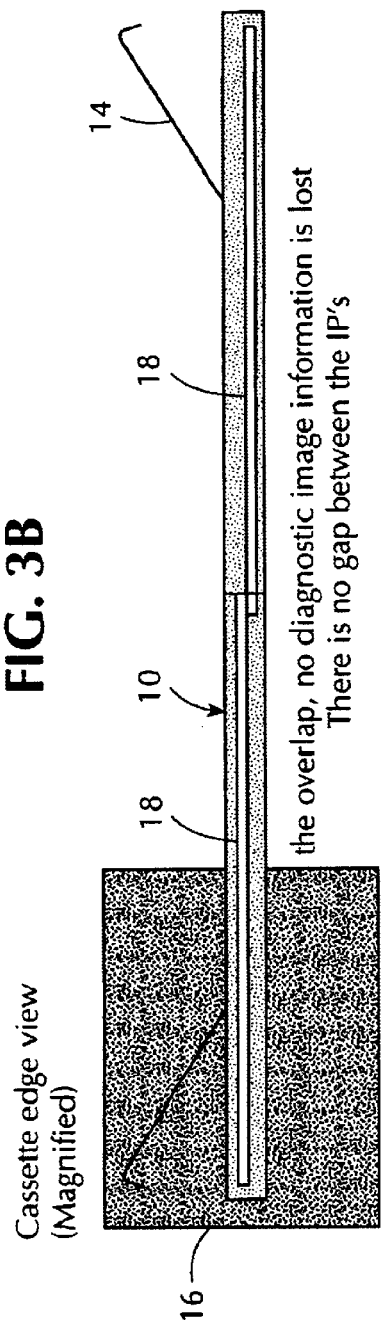
FIG. 3B Shows a magnified cassette edge view of two imaging plates inserted into a modified cassette holder of the invention demonstrating the overlap of the imaging plates.
Figure 5:
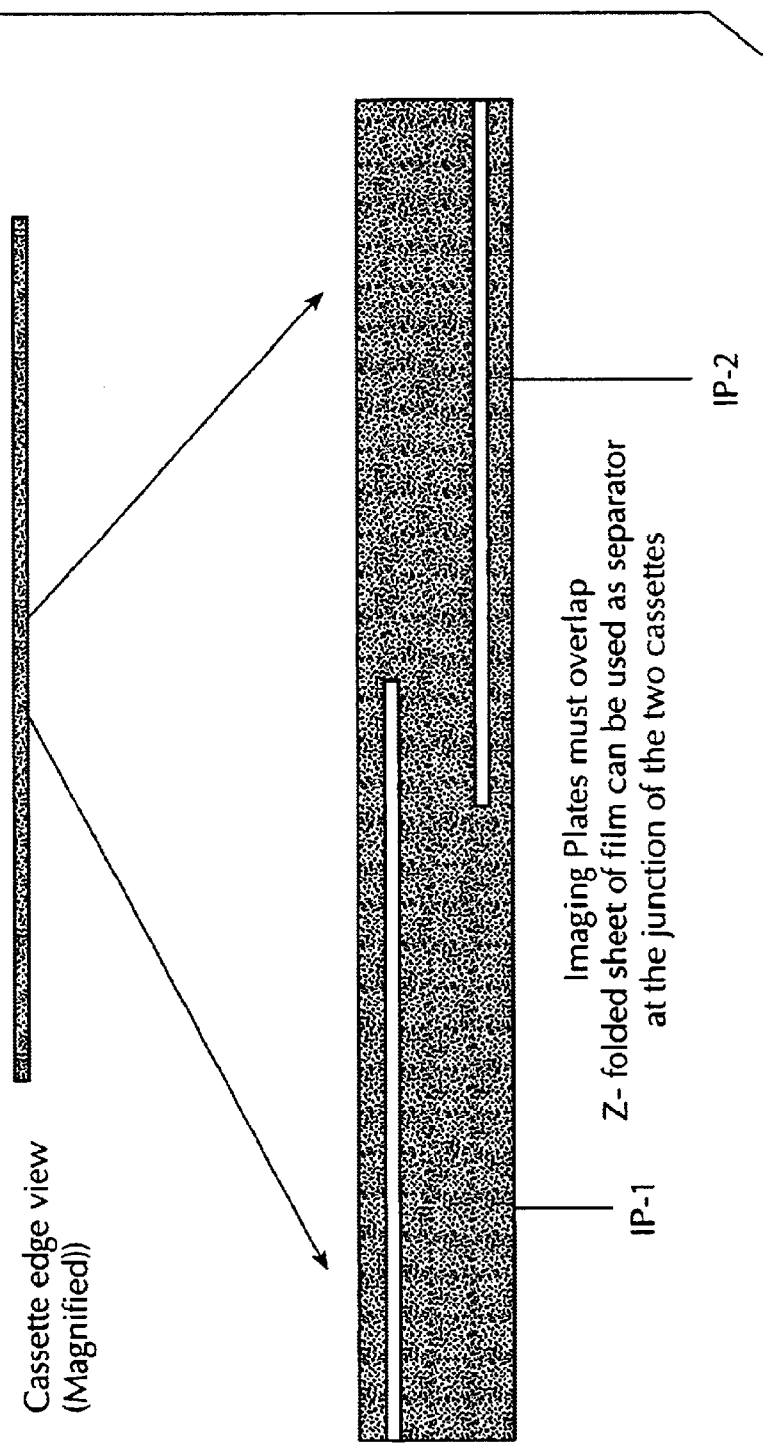
FIG. 5 Shows a magnified view of the "Z" fold of material that is preferably part of the invention.

As shown in FIGS. 3A and 3b, for example, this invention volves an X-ray film cassette with a rectangular cartridge body having a front wall 4, a pair of side walls 2 and a back wall 6. A rectangular cover 14 is hinged at one side thereof to the back wall 6 of the body by hinge 12. A latch 8 is provided at one side of the cover 14 opposite to the hinged side, this latch 8 being manually operable to be moved from a latching position to a released position. A slot is provided in the front wall 4 of the body to engage the latch 8 of the cover 14, and at least two imaging plates 18 are provided for recording an image generated by an X-ray source. The imaging plates 18 are arranged in partial oven overlapping relation overlap so as to prevent a loss of diagnostic information.

The cassettes are joined at the bottom and would not be hinged on the back creating one long cassette with two latch ends. The CF front may be replaced with Aluminum strips to strengthen cassette 10.

Preferably, the invention provides for an x-ray cassette that will hold 14"×17" imaging plates. These imaging plates (e.g. film) must overlap inside the cassette in order to prevent loss of image and diagnostic information. In the prior art, there is a narrow space on typical x-ray film where no diagnostic information is recorded due to the space existing between even two sequentially used imaging plates (IP). To resolve this failure the current invention may provide for a modified cassette structure designed to accommodate securely two overlapping image plates. The top and bottom of the "Z" fold should be folded under the fabric inside the cassette so the IP's do not strike the edge of the "Z" film when being placed in the cassette. For the overlapping IP's a "Z" folded sheet of fabric or other suitable material can be used as a separator at the junction of the two cassettes. Preferably, the "Z" folded sheet is made of a polyester material. In addition the "Z" folded sheet may also be lined on both sides with phosphor imaging materials.

As previously mentioned, the "Z" film must overlap. Preferably, this overlap is less than 0.5 of an inch. Preferably, the "Z" fold is fabricated out of polyester material.

To accommodate this change the size of standard cassettes may be altered to provide for sufficient overlap of imaging plates. When employed in this fashion sequential x-ray photographs retain the full-length image of a desired object, such as an individuals spine, without loss of any diagnostic information. Typically the cassette will need to be shortened by up to 1.0 inch to provide sufficient overlap, preferably the modified cassette holder will be shortened by 0.5 inch.

The method in accordance with the present invention comprises maintaining an X-ray film and a stimulable phosphor sheet in close contact with each other and shielded from light, and exposing said X-ray film and said stimulable phosphor sheet to X-rays through an object. The X-ray image of said object is then scanned by a laser digitally recorded in a computed radiography reader. At the same time, said X-ray film is exposed to light instantaneously emitted from said stimulable phosphor sheet upon exposure to X-rays to record a photographic latent image of the same X-ray image on said X-ray film.

Thus, it can be appreciated that an x-ray cassette system and film therefore have been presented which will facilitate an improvement in the diagnostic use of x-ray photographs, particularly for the spine and the other long bones of an individual animal.

Accordingly, it is to be understood that the embodiments of the invention herein providing for an improved diagnostic and informational use of x-ray photographs are merely illustrative of the application of the principles of the invention. It will be evident from the foregoing description that changes in the form, methods of use, and applications of the elements of the disclosed x-ray cassette system and associated elements disclosed may be resorted to without departing from the spirit of the invention, or the scope of the appended claims.

What is claimed is:

1. A X-ray film cassette comprising:
   a rectangular cartridge body having a front wall, a pair of side walls and a back wall;
   a rectangular cover hinged at one side thereof to the back wall of said body by a hinge;
   a latch provided at one side of said cover opposite to the hinged side, said latch being manually operable to be moved from a latching position to a released position;
   a slot provided in the front wall of the body to be engaged with said latch of the cover; and
   at least two imaging plates for recording an image generated by an X-ray source, said at least two imaging plates being arranged in partial overlapping relation so as to prevent a loss of diagnostic information.

2. The cassette of claim 1, wherein said at least two imaging plates can be processed by a computed radiography reader without manually removing the imaging plates from the cassette.

3. The cassette of claim 1, further comprising a plurality of indicia marks on said imaging plates arranged such that said imaging plates can be automatically aligned.

4. The cassette of claim 1, wherein said at least two imaging plates are separated by a "Z" fold of a material having a size that is sufficient prevent said overlapping image plates from coming into direct contact with each other.

5. The cassette of claim 1, wherein said imaging plates are 14"×17" in size.

6. A X-ray cassette comprising:
   a rectangular cartridge body having a front wall, a pair of side walls and a back wall;
   a rectangular cover hinged at one side thereof to the back wall of said body by a hinge;
   a latch provided at one side of said cover opposite to the hinged side, said latch being manually operable to be moved from a latching position to a released position;
   a slot provided in the front wall of the body to be engaged with said latch of the cover; and
   at least two imaging plates for recording an image generated by an X-ray source on a photostimulable phosphor sheet, said at least two imaging plates being arranged in partial overlapping relation so as to prevent a loss of diagnostic information.

7. The cassette of claim 6, wherein said least two imaging plates can be processed by a computed radiography reader without manually removing the imaging plates from cassette.

8. The cassette of claim 6, further comprising a plurality of indicia marks on said imaging plates arranged such that said imaging plates can be automatically aligned.

9. The cassette of claim 6, wherein said at least two imaging plates are separated by a "Z" fold of a material having a size that is sufficient to prevent said overlapping image plates from coming into direct contact with each other.

10. The cassette of claim 6, wherein said imaging plates are 14"×17" in size.

* * * * *